United States Patent [19]
Mitchell

[11] 4,216,067
[45] Aug. 5, 1980

[54] SOLAR ENERGY OPERATED HYDROGEN REFINING PROCESS

[76] Inventor: Glen Mitchell, 5840 Walerga Rd., #2, Sacramento, Calif. 95842

[21] Appl. No.: 54,011

[22] Filed: Jul. 2, 1979

[51] Int. Cl.$^2$ .............................................. C25B 1/04
[52] U.S. Cl. ................................................ 204/129
[58] Field of Search .................................... 204/129

[56] References Cited

FOREIGN PATENT DOCUMENTS 2754668  6/1978  Fed. Rep. of Germany ........... 204/129

OTHER PUBLICATIONS

"Solar Energy, and the $H_2$ Economy:Analysis of Schemes for Producing $H_2$" by A. V. Sheklein, Geliote Khnika vol. 12, No. 4 pp.81-89, 1976.

*Primary Examiner*—R. L. Andrews

[57] ABSTRACT

A solar powered apparatus for changing water to hydrogen and oxygen gases; the apparatus including a solar powered, heat exchanger driving a turbine which turns a D.C. generator from which negative and positive electrodes extend into an electrolysis tank containing water, and gas collecting above each electrode being connected to either a hydrogen or oxygen storage tank.

6 Claims, 3 Drawing Figures

SOLAR ENERGY OPERATED HYDROGEN REFINING PROCESS

This invention relates generally to apparatus and processes for production of hydrogen and oxygen gases commercially.

A principal object of the present invention is to provide an improved solar energy operated hydrogen refining process, which produces a hydrogen gas by taking advantage of the current stage of solar power development.

Firstly, a low density solar energy is collected and transferred to a heat conductor's carrier liquid, i.e., water or petroleum distillate, such as 10 W or 20 W oil. This energy is then transferred to a heat exchanger and the key working fluid. This is pentane ($C_5H_{12}$) for the reason that it has a boiling point at atmospheric pressure of 39 degrees C. (102 degrees F.). For practical purposes, working pressures can be developed at relatively low temperatures.

(Ref.: absolute pressure of 40 p s i 210 degrees F. vs. 14 p s i at 210° F. for water), this means that at a temperature range (300 degrees F. to 387 degrees F.) between 100 p s i and the critical of 482 p s i can be utilized to produce rotational mechanical energy. Coupled with rotating direct current generating equipment, adequate direct current can be generated, for the electrolysis of water into oxygen and hydrogen gases.

This system is significant in that there is not the sophisticated high energy threshold level presently required for electrical energy production. The invention, as presently defined, can be operated at various levels of collected energy, which is a definite advantage to today's system of high temperature power generation. The electrolysis products of hydrogen and oxygen are piped to storage tanks at their production rates, in order to be utilized for supplementing fossil fuel uses, such as propane, natural gas, jet fuel, or other transport fuels.

This comprises a summary of applicant's research and experimentation in the areas of solar energy collection and pentane vapor expansion.

A simple parabolic reflector was constructed from aluminum flaring with wooden spacers, so constructed that the focus point was three inches from the opening on top of the reflector. At this point, a one inch steel pipe was placed, in order to provide a heat transfer surface, as well as providing a structural integrity.

On a sunny day, water was pumped through the pipe, in order to collect and transfer the solar heat energy. Then, by measuring the weight and temperature increase of the water, it was determined that an average of 980 BTU's per hour could be collected from a surface area of 1360 cubic inches (17 by 80 inches), in this manner.

This information proved to be fairly consistent, considering the wide deviation potential of solar exposure.

The information for the accompanying diagram (FIG. 1) was attained by placing approximately two gallons of gasoline in a sealed steel pressure tank having a pressure gauge. Considering the heat range applied to the gasoline, a certain amount of the vapor pressure could be discounted by the other principal components (i.e., sextane, septane), but since pentane has the lowest boiling point, it could be assumed that it provided an appropriate portion of the total vapor pressure.

It should be considered that the pentane critical, 482 p s i pressure is achieved at a temperature of 387 degrees F. (197 degrees C.) and at the same temperature, water develops a vapor pressure of only 208 p s i.

Another important advantage is in the area of heat required for vaporization. Whereas, this requirement is 1038.6 BTU's per pound for water, pentane necessitates only 157.5 BTU's per pound, which is a difference of 981.1 BTU's per pound.

Accordingly, for these reasons, pentane appears to be a viable working fluid for low temperature application (100 to 400 degrees F.), so as to provide the mechanical energy for the production of hydrogen by electrolysis at the various energy levels that accompany any form of solar energy collection.

Other objects are to provide an improved solar energy operated hydrogen refining process which is of simple design, inexpensive in construction of equipment therefor, that is easy to use and which is efficient.

These, and other objects, will be readily evident, by a study of the following specification, and the accompanying drawing wherein.

Figure 1:
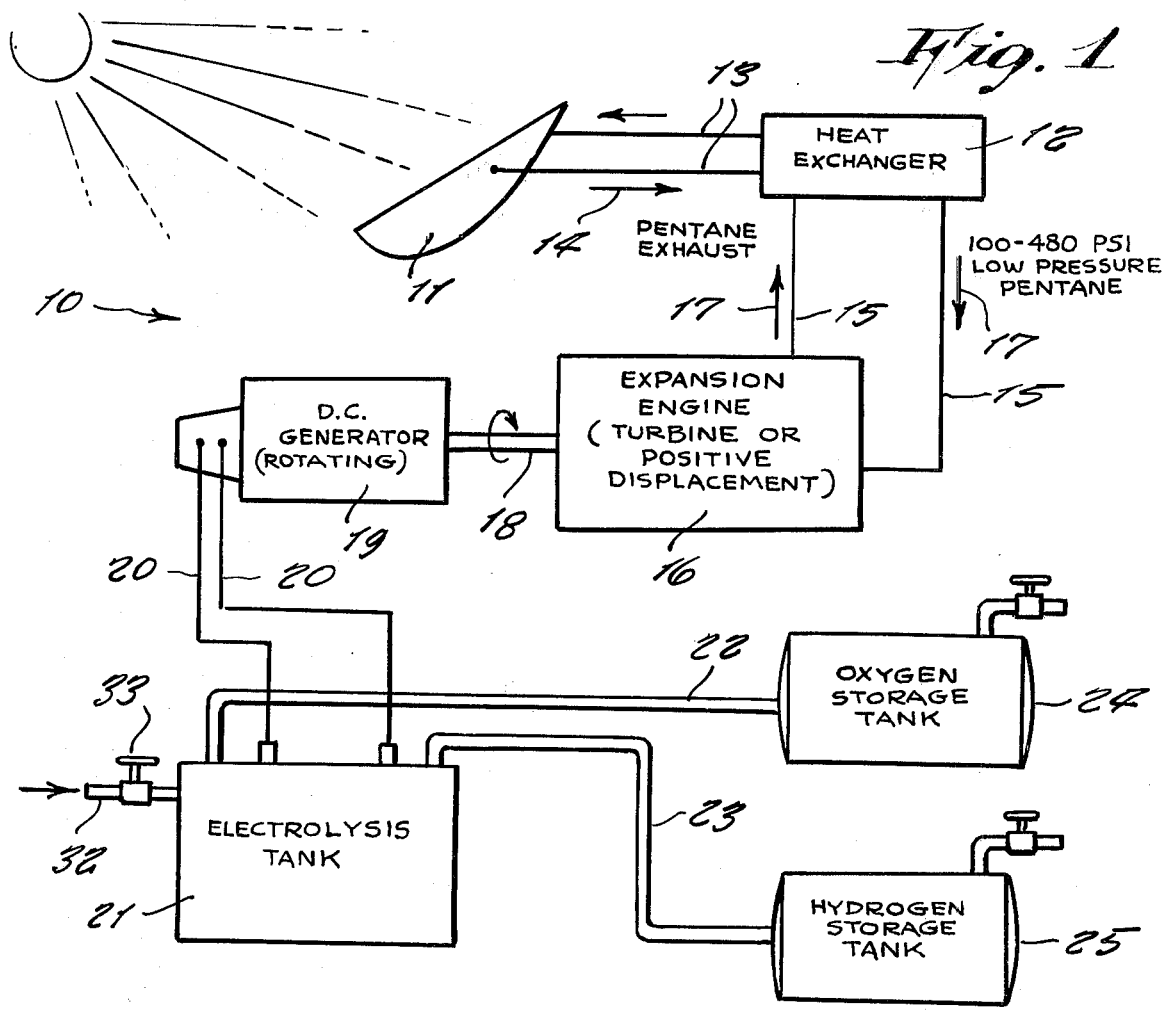
FIG. 1 is a block diagram of the present invention.

Referring now to the drawing in greater detail, the reference numeral 10 represents an improved solar energy operated hydrogen refining process, according to the present invention, wherein a solar collector 11 is connected to a heat exchanger 12, by means of pipes 13, through which a liquid flows in the direction indicated by arrows 14. Pipes 15, from the heat exchanges, connect to an expansion engine turbine 16, liquid flow through the pipes 15 being shown by arrows 17. The turbine is coupled by a shaft 18 to a D.C. generator 19, from where power lines 20 extend into an electrolysis tank 21. Pipes 22 and 23 extend therefrom to oxygen and hydrogen storage tanks 24 and 25, respectively.

Figures 2, 3:
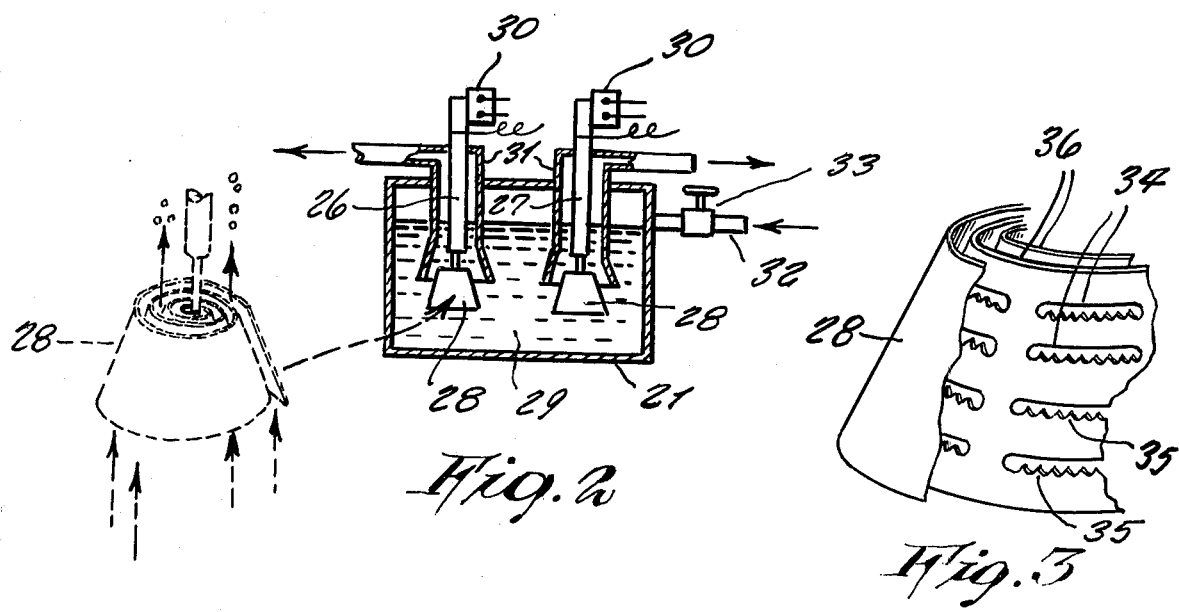
FIG. 2 is a cross-sectional view illustrating one possible design of electrolysis electrodes.
FIG. 3 is a fragmentary perspective view of the conical, spiralled plate shown in FIG. 2, illustrating a further detail thereof.

The cross-sectional view of tank 21, shown in FIG. 2, shows each electrode 26 and 27 having a spirally wrapped plate 28 affixed at their lower end, and which is loosely wound, so that water 29 can circulate therethrough; the plate thus forming a relatively very much larger surface area for electrolysis action than is possible by simply a wire, so that a large production of gas can be more quickly accomplished.

A vibrator 30, secured at the top of each electrode, shakes gas bubbles loose from the plate 28, immediately after being formed, so as to keep the entire plate exposed a maximum time to the water for gas production. The generator 19 powers the vibrators.

A tube 31, around each electrode, extends down into the water; a lower end of each tube being flared, so as to catch all the gas bubbles from the plates. The tubes connect to the pipes 22 and 23, fresh water to the tank 21 is admitted through a line 32 fitted with valve 33.

FIG. 3 additionally shows each plate 28 additionally having a series of horizontal slots 34, having tooth serrations 35 along a lower edge thereof, in order to prevent gas bubbles from climbing up to a top edge 36 of the plate, before breaking away therefrom, thus hastening the bubble break away. This design may be used in substitution of the vibrators 30, as they involve no power to operate. Alternately, both may be used.

While various changes may be made, it is understood that such changes will be within the spirit and scope of the present invention, as is defined by the appended claims.

What I now claim is:

1. A process in which a low density energy source is used to produce hydrogen gas from water by electrolysis method, comprising, in combination, a liquid carrier being heated by an energy source, said carrier being carried to a heat exchanger where the heat from said carrier is transferred to pentane ($C_5H_{12}$) fluid having a relatively low boiling point at atmospheric pressure of 39 degrees C. or 102 degrees F., such pentane fluid circulating through an expansion engine coupled to a direct current generator providing power to positive and negative electrodes submerged in water of a tank, a hydrogen gas being produced by electrolysis at one electrode and oxygen gas being produced by electrolysis at another electrode, said gases then being collected therefrom in separate storage tanks; each said electrode having a spiral, loosely wound plate that is vibrated by a vibrator at an upper end of said electrode.

2. The combination as set forth in claim 1, wherein said low density energy source comprises a solar collector, a geothermal hot springs or industrial waste heat.

3. The combination as set forth in claim 2, wherein said liquid carrier comprises a water or petroleum distillate oil vehicle of 10 W or 20 W.

4. The combination as set forth in claim 3, wherein said expansion engine is of turbine or positive displacement type.

5. The combination as set forth in claim 4, wherein each said plate is affixed to a lower end of said electrode, each said plate being slotted.

6. The combination as set forth in claim 5, wherein each slot of said plates has serrated teeth for break away of gas bubbles therefrom.

* * * * *